(12) United States Patent
He

(10) Patent No.: US 11,190,536 B2
(45) Date of Patent: Nov. 30, 2021

(54) WEBSITE VULNERABILITY SCAN METHOD, DEVICE, COMPUTER APPARATUS, AND STORAGE MEDIUM

(71) Applicant: PING AN TECHNOLOGY (SHENZHEN) CO., LTD., Guangdong (CN)

(72) Inventor: Shuangning He, Guangdong (CN)

(73) Assignee: PING AN TECHNOLOGY (SHENZHEN) CO., LTD., Guangdong (CN)

( * ) Notice: Subject to any disclaimer, the term of this patent is extended or adjusted under 35 U.S.C. 154(b) by 529 days.

(21) Appl. No.: 16/097,693

(22) PCT Filed: Oct. 30, 2017

(86) PCT No.: PCT/CN2017/108295
§ 371 (c)(1),
(2) Date: Oct. 30, 2018

(87) PCT Pub. No.: WO2019/047346
PCT Pub. Date: Mar. 14, 2019

(65) Prior Publication Data
US 2021/0226978 A1 Jul. 22, 2021

(30) Foreign Application Priority Data
Sep. 11, 2017 (CN) .......................... 201710813350.3

(51) Int. Cl.
*H04L 29/00* (2006.01)
*H04L 29/06* (2006.01)

(52) U.S. Cl.
CPC ................................ *H04L 63/1433* (2013.01)

(58) Field of Classification Search
CPC ............... H04L 63/1433; H04L 63/145; H04L 63/1425; H04L 63/101
See application file for complete search history.

(56) References Cited

U.S. PATENT DOCUMENTS 6,735,700 B1 * 5/2004 Flint ....................... G06F 21/56
713/188
7,836,502 B1 * 11/2010 Zhao ................... H04L 63/1416
726/22
(Continued)

FOREIGN PATENT DOCUMENTS

CN 104980309 A 10/2015
CN 105938533 A 9/2016
(Continued)

OTHER PUBLICATIONS

International Search Report dated Jan. 2, 2018 in the parent application PCT/CN2017/108295, 11 Pages.
(Continued)

*Primary Examiner* — Don G Zhao
(74) *Attorney, Agent, or Firm* — Polsinelli PC

(57) ABSTRACT

A method of scanning website vulnerability comprising: reading a vulnerability scan task in a scan task pool; finding a website corresponding to the vulnerability scan task, acquiring access data of the website, and obtaining a popularity coefficient of the website according to the access data; acquiring historical vulnerability scan data and a vulnerability risk level table, and obtaining a security risk coefficient of the vulnerability scan task according to the historical vulnerability scan data and the vulnerability risk level table; acquiring update time data of the vulnerability scan task, and calculating a time coefficient of the vulnerability scan task according to the update time data; inputting the popularity coefficient, the security risk coefficient, and the time coefficient into a preset priority evaluation model for processing, and obtaining an execution priority weight of the vulnerability scan task; and executing vulnerability scan tasks in the scan task pool in descending order according to the execution priority weights.

9 Claims, 5 Drawing Sheets

(56) References Cited

U.S. PATENT DOCUMENTS

| | | | | |
|---|---|---|---|---|
| 8,266,703 | B1* | 9/2012 | Magdych | H04L 63/1433 726/25 |
| 8,392,379 | B2* | 3/2013 | Lee | G06F 16/1734 707/687 |
| 8,478,708 | B1 | 7/2013 | Larcom | |
| 8,516,590 | B1* | 8/2013 | Ranadive | H04L 63/1483 726/24 |
| 8,683,584 | B1* | 3/2014 | Daswani | G06F 21/62 726/22 |
| 8,832,836 | B2* | 9/2014 | Thomas | H04L 63/1491 726/24 |
| 8,850,570 | B1* | 9/2014 | Ramzan | H04L 63/145 726/22 |
| 9,560,069 | B1* | 1/2017 | Agarwal | H04L 63/1416 |
| 9,569,449 | B2* | 2/2017 | Taylor | G06Q 10/00 |
| 2012/0017281 | A1* | 1/2012 | Banerjee | G06F 21/577 726/25 |
| 2012/0036580 | A1* | 2/2012 | Gorny | H04L 63/1433 726/25 |
| 2013/0247204 | A1* | 9/2013 | Schrecker | H04L 63/1433 726/25 |
| 2016/0080410 | A1* | 3/2016 | Gorny | H04L 63/101 726/25 |
| 2016/0373478 | A1 | 12/2016 | Doubleday et al. | |
| 2018/0013769 | A1* | 1/2018 | Robinson | H04L 61/2007 |

FOREIGN PATENT DOCUMENTS

| | | |
|---|---|---|
| CN | 106130980 A | 11/2016 |
| CN | 106657096 A | 5/2017 |

OTHER PUBLICATIONS

Singaporean Office Action dated Sep. 2, 2021 issued in corresponding Patent Application No. 11201809821T (11 pages).

* cited by examiner

WEBSITE VULNERABILITY SCAN METHOD, DEVICE, COMPUTER APPARATUS, AND STORAGE MEDIUM

CROSS-REFERENCE TO RELATED APPLICATIONS

This application is a National Phase filing under 35 U.S.C. § 371 of PCT/CN2017/108295 filed on Oct. 30, 2017, and claims priority to Chinese Patent Application No. 2017108133503, entitled "Website Vulnerability Scan Method, Device, Computer Apparatus, and Storage Medium" filed Sep. 11, 2017. The entire contents of each application are hereby incorporated by reference.

TECHNICAL FIELD

The present disclosure relates to network security technologies, and in particular, to a website vulnerability scan method, a device, a computer apparatus, and a storage medium.

BACKGROUND

Website vulnerability scan technology plays an important role in ensuring network security. Currently, when scanning website vulnerability, vulnerability scan tasks are generally scheduled to be executed according to a sequence thereof, or randomly scheduled to be executed. However, the aforementioned scan task execution manner does not consider a difference between the vulnerability scan tasks, thus having a certain degree of blindness and repetitiveness, which makes it impossible to discover the vulnerability of the website quickly and effectively, thereby causing a low effectiveness and a poor scan performance of the website vulnerability scan, which makes it impossible to effectively avoid security risks of the website and effectively protect a data security of a user.

SUMMARY

According to various embodiments of the present disclosure, a website vulnerability scan method, a device, a computer apparatus, and a storage medium are provided.

A method of scanning website vulnerability includes:
reading a vulnerability scan task in a scan task pool;
finding a website corresponding to the vulnerability scan task, acquiring access data of the website, and obtaining a popularity coefficient of the website according to the access data;
acquiring historical vulnerability scan data and a vulnerability risk level table, and obtaining a security risk coefficient of the vulnerability scan task according to the historical vulnerability scan data and the vulnerability risk level table;
acquiring update time data of the vulnerability scan task, and calculating a time coefficient of the vulnerability scan task according to the update time data;
inputting the popularity coefficient, the security risk coefficient, and the time coefficient into a preset priority evaluation model for processing, and obtaining an execution priority weight of the vulnerability scan task; and
executing vulnerability scan tasks in the scan task pool in descending order according to the execution priority weights.

A device of scanning website vulnerability includes:
a task reading module configured to read a vulnerability scan task in a scan task pool;
a popularity coefficient obtaining module configured to find a website corresponding to the vulnerability scan task, acquire access data of the website, and obtain a popularity coefficient of the website according to the access data;
a security risk coefficient obtaining module configured to acquire historical vulnerability scan data and a vulnerability risk level table, and obtain a security risk coefficient of the vulnerability scan task according to the historical vulnerability scan data and the vulnerability risk level table;
a time coefficient obtaining module configured to acquire update time data of the vulnerability scan task, and calculate a time coefficient of the vulnerability scan task according to the update time data;
a priority weight obtaining module configured to input the popularity coefficient, the security risk coefficient, and the time coefficient into a preset priority evaluation model for processing, and obtain an execution priority weight of the vulnerability scan task; and
a scan task execution module configured to execute vulnerability scan tasks in the scan task pool in descending order according to the execution priority weights.

A server includes:
one or more processors, and
a memory storing computer readable instructions, which, when executed by the one or more processors cause the one or more processors to perform steps comprising:
reading a vulnerability scan task in a scan task pool;
finding a website corresponding to the vulnerability scan task, acquiring access data of the website, and obtaining a popularity coefficient of the website according to the access data;
acquiring historical vulnerability scan data and a vulnerability risk level table, and obtaining a security risk coefficient of the vulnerability scan task according to the historical vulnerability scan data and the vulnerability risk level table;
acquiring update time data of the vulnerability scan task, and calculating a time coefficient of the vulnerability scan task according to the update time data;
inputting the popularity coefficient, the security risk coefficient, and the time coefficient into a preset priority evaluation model for processing, and obtaining an execution priority weight of the vulnerability scan task; and
executing vulnerability scan tasks in the scan task pool in descending order according to the execution priority weights.

At least one non-transitory computer readable medium includes computer readable instructions, which, when executed by at least one processor cause the at least one processor to perform steps including:
reading a vulnerability scan task in a scan task pool;
finding a website corresponding to the vulnerability scan task, acquiring access data of the website, and obtaining a popularity coefficient of the website according to the access data;
acquiring historical vulnerability scan data and a vulnerability risk level table, and obtaining a security risk coefficient of the vulnerability scan task according to the historical vulnerability scan data and the vulnerability risk level table;
acquiring update time data of the vulnerability scan task, and calculating a time coefficient of the vulnerability scan task according to the update time data;
inputting the popularity coefficient, the security risk coefficient, and the time coefficient into a preset priority evaluation model for processing, and obtaining an execution priority weight of the vulnerability scan task; and executing vulnerability scan tasks in the scan task pool in descending order according to the execution priority weights.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

In order to make the objects, technical solutions and advantages of the present application more clear, the present application will be further described in detail below with reference to the accompanying drawings and embodiments. It will be understood that the specific embodiments described herein are merely shown by way of illustration and not intended to be as a limitation of the invention.

Figure 1:
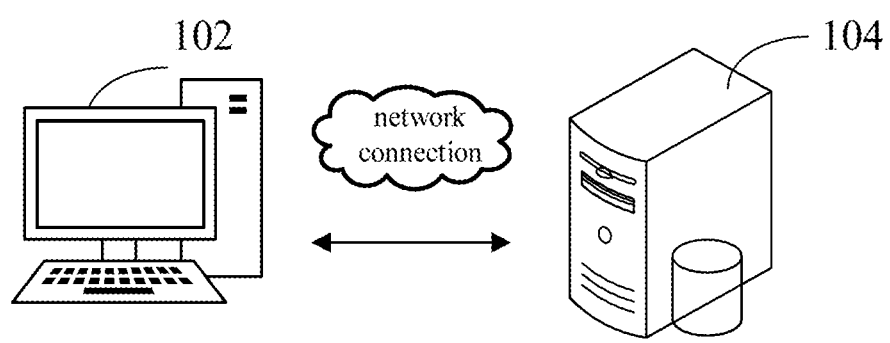
FIG. 1 is a schematic diagram illustrating an environment adapted for a method of scanning website vulnerability according to one of the embodiments.

The method of scanning website vulnerability provided in the embodiments of the present application can be implemented in an application environment shown in FIG. 1. A task terminal 102 communicates with a server 104 over a network, and the task terminal can be one or more. When the task terminal 102 has a vulnerability scan task request or a request update, the task terminal 102 sends a vulnerability scan task to the server 104, and the server 104 adds the vulnerability scan task into a scan task pool after receiving the vulnerability scan task sent by the task terminal 102. The server 104 reads vulnerability scan tasks in the scan task pool one by one; finds access data of a website corresponding to the vulnerability scan task, and obtains a popularity coefficient of the website; obtains historical vulnerability scan data and a vulnerability risk level table; and calculates a security risk coefficient of the vulnerability scan task. The server 104 records update time data when receiving the vulnerability scan data from the task terminal 102; calculates a time coefficient of the corresponding task according to the update time data, and processes the popularity coefficient, the security risk coefficient, and the time coefficient to obtain an execution priority weight of the vulnerability scan task. The vulnerability scan tasks in the scan task pool are executed in descending order according to the execution priority weights. Executing scan tasks based on priority can improve the effectiveness of the scan, discover the website vulnerabilities timely and efficiently, and avoid website security risks.

Figure 2:
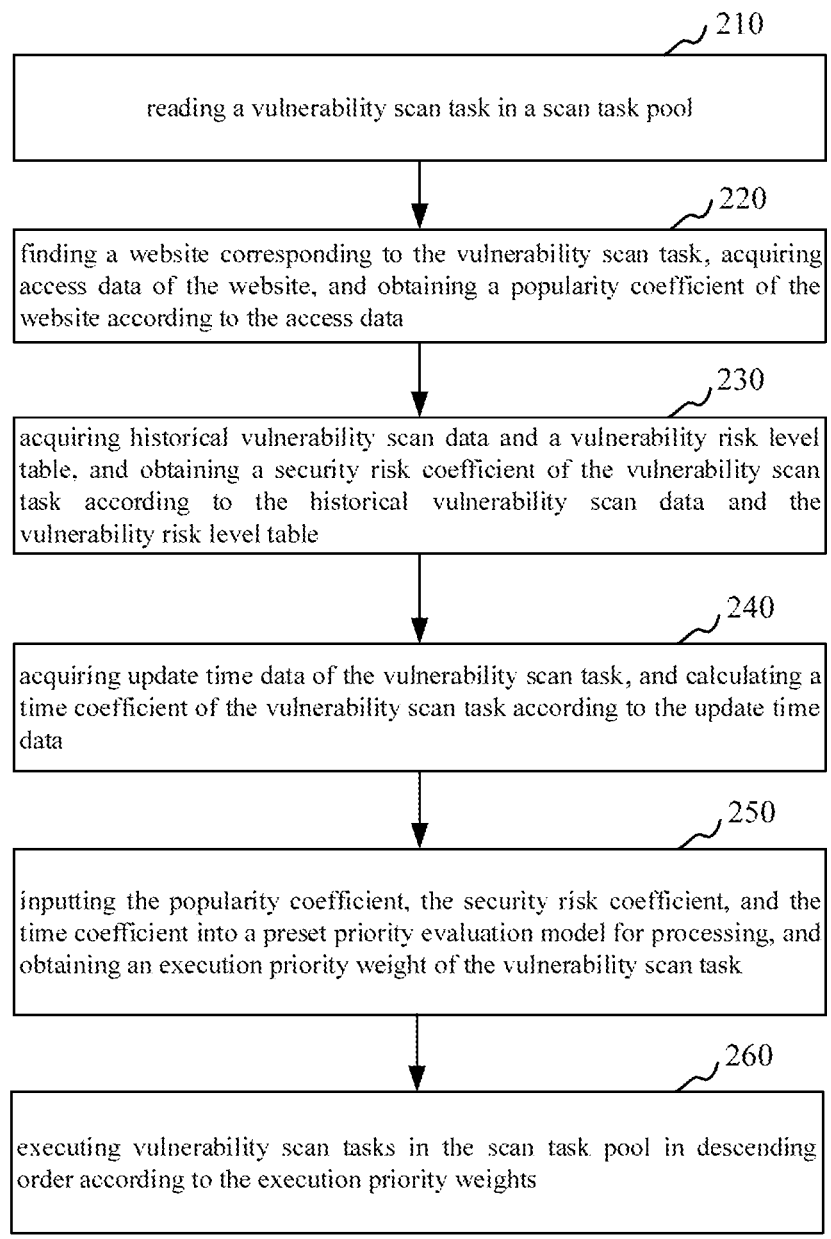
FIG. 2 is a flowchart illustrating a method of scanning website vulnerability according to one of the embodiments.

FIG. 2 is a schematic flowchart of the method according to one embodiment of the present application. It should be understood that although the various steps in the flowchart of FIG. 2 are sequentially displayed as indicated by the arrows, these steps are not necessarily executed in a sequence indicated by the arrows. Unless the context clearly requires otherwise, the executions of these steps are not strictly limited, and can be executed in other sequences. Moreover, at least some of the steps in FIG. 2 can include a plurality of sub-steps or stages, which are not necessarily executed at the same time, but can be executed at different times, and a execution sequence thereof is not necessarily sequential. The sub-steps or stages can be executed in turn or alternately with other steps or at least some of the sub-steps or stages of other steps.

In one embodiment, as shown in FIG. 2, a method of scanning website vulnerability is provided. The method is applied to a server as an example, which specifically includes the following steps.

In step 210, a vulnerability scan task is read in a scan task pool.

The vulnerability scan task is a task used for scanning a website vulnerability. The vulnerability scan task includes a data for website vulnerability scanning. The data includes but not limited to a domain name, an IP address, a process port, a URL (Uniform Resource Location), CGI (common Gateway Interface), and the like of a website. The website that needs to be scanned can be uniquely determined according to the relevant data contained in the vulnerability scan task.

The scan task pool includes a plurality of vulnerability scan tasks waiting to be executed. The server reads the vulnerability scan task sequentially from the scan task pool.

In step 220, a website corresponding to the vulnerability scan task is found, access data of the website is acquired, and a popularity coefficient of the website is obtained according to the access data.

The server finds the website corresponding to the vulnerability scan task according to the data contained in the read vulnerability scan task. The server acquires the access data of the found corresponding website. The access data can be an access traffic data of the website or the number of times that the website is accessed by users. A frequency that the website is accessed by users can be measured according to the access data.

The server acquires the access data of the websites corresponding to all the vulnerability scan tasks in the task pool, and compares the access data of the website corresponding to the read vulnerability scan task with the access data of all websites involved in the scan task pool, and calculates the popularity coefficient of the website corresponding to the read vulnerability scan task according to the comparison result. The popularity coefficient indicates the frequency that the website is accessed by users. Therefore, a website with a large popularity coefficient has a larger user group and a larger user frequency. Under the same conditions, the vulnerability scan task with a larger popularity coefficient should be scanned preferentially with respect to the vulnerability scan task with a smaller popularity coefficient.

In step 230, historical vulnerability scan data and a vulnerability risk level table are acquired, and a security risk coefficient of the vulnerability scan task is obtained according to the historical vulnerability scan data and the vulnerability risk level table.

The server acquires the historical vulnerability scan data of the scan task pool and a pre-stored vulnerability risk level table. The historical vulnerability scan data includes data such as vulnerability names, the number of vulnerabilities, and the like of security vulnerabilities scanned in the history scan of each vulnerability scan task in the scan pool, as well as vulnerability names, the number of vulnerabilities, and the like of security vulnerabilities scanned in the history scan of the website corresponding to each vulnerability scan task.

The vulnerability risk level table records a map relation between the vulnerability names and vulnerability attributes of the security vulnerabilities and risk scores of the vulnerabilities. The server can find the vulnerability scan task and the risk score of the vulnerability scanned in the history scan of the corresponding website from the vulnerability risk level table and calculates the task risk coefficient of the vulnerability scan task according to the found risk score. The higher the risk coefficient of the vulnerability scan task, the more dangerous a target scan vulnerability of the task is, so that under the same conditions, the vulnerability scan task with the larger task risk coefficient should be preferentially executed than the vulnerability scan task with the smaller task risk coefficient.

In step 240, update time data of the vulnerability scan task is acquired, and a time coefficient of the vulnerability scan task is calculated according to the update time data.

The same vulnerability scan task can be executed multiple times, so that the same vulnerability can be tracked regularly. Sometimes the security vulnerabilities can be scanned out after executing the vulnerability scan task, while sometimes the security vulnerabilities can be scanned out. As the security vulnerabilities continue to escalate, the vulnerability scan tasks are required to be escalated based on vulnerability upgrades as well. Therefore, task contents of the vulnerability scan task are updated according to the changes of the security vulnerabilities.

The server acquires the update time data of the vulnerability scan task. The update time data includes updated time data of the task contents of the vulnerability scan task, and the time data in the history scan of the vulnerability scan task when scanning out the security vulnerabilities as well. The server calculates the time coefficient of the vulnerability scan task according to the acquired update time data. The time coefficient can reflect how long the vulnerability scan task has not scanned out the vulnerability, and how long the task content has not been updated. The longer the vulnerability scan task does not scan out the vulnerability and the longer the content is not updated, the higher the security risk of the vulnerability and the higher the urgency of execution as well.

In step 250, the popularity coefficient, the security risk coefficient, and the time coefficient are input into a preset priority evaluation model for processing, and an execution priority weight of the vulnerability scan tasks are obtained.

The server acquires the preset priority evaluation model, which evaluates an execution priority of the vulnerability scan tasks. The preset priority evaluation model can be a linear regression model, a nonlinear regression model, etc., and characteristic coefficients in the model are obtained by prior training. The server inputs the popularity coefficient, the security risk coefficient, and the time coefficient of the vulnerability scan task into the preset priority evaluation model. The preset priority evaluation model processes the aforementioned coefficients according to a model calculation formula to obtain the execution priority weight of the vulnerability scan tasks. The larger the execution priority weight of the vulnerability scan task, the higher the execution priority, and the vulnerability scan task should be executed preferentially.

In step 260, the vulnerability scan tasks in a scan task pool are executed in descending order according to the execution priority weights.

After the server calculates all the vulnerability scan tasks in the scan task pool, all the vulnerability scan tasks are sorted according to the execution priority weight of each task, and then the vulnerability scan tasks in the scan task are executed according to the sequence in the task pool.

In the method of scanning website vulnerability described in this embodiment, before executing the vulnerability scan task in the scan task pool, the execution priority of all the vulnerability scan tasks in the task pool are evaluated. The popularity coefficient of the website is obtained by acquiring the access data of the website to which the task belongs. The security risk coefficient of the scan task is comprehensively evaluated according to the historical scan data and the vulnerability risk data in the task pool. The update time of the task is acquired to calculate the time coefficient, thereby evaluating the execution urgency of the task. Finally, after inputting the popularity coefficient, the security risk coefficient, and the time coefficient into the priority evaluation model, the execution priority weight of the task is input and the tasks in the scan pool are executed according to the priority weights. Therefore, the priority of the vulnerability scan task can be comprehensively evaluated from the access popularity of the website to which the vulnerability belongs, the security risk situation and the urgency degree of the vulnerability, and the scan task can be performed according to the priority, which improves the effectiveness of scan, discovers the website vulnerabilities timely and efficiently, and avoids website security risks.

In one embodiment, the method for calculating the popularity coefficient of the website according to the access data of the website specifically includes follow steps. The number of times that the website corresponding to the read vulnerability scan task is accessed by the user and the number of times that the websites corresponding to all the vulnerability scan tasks in the scan task pool are accessed by the user are acquired. The sum of the number of times that all the websites corresponding to all the vulnerability scan tasks are accessed is calculated. The ratio of the number of times that the website corresponding to the read vulnerability scan task is accessed and the sum of the number of times that all the websites corresponding to all the vulnerability scan tasks are accessed is taken as the popularity coefficient of the website.

Specifically, it is assumed that the number of websites corresponding to all the vulnerability scan tasks in the scan task pool is n; the read vulnerability scan task corresponds to the $i^{th}$ website, the number of times that the $i^{th}$ website is accessed is indicated by $X_i$, and the popularity coefficient of the $i^{th}$ website is indicated by $Y_i$, then the popularity coefficient of the $i^{th}$ website can be calculated by formula (1).

$$Y_i = \frac{X_i}{\sum_1^n X_i} \tag{1}$$

In formula (1), $Y_i \in (0,1]$, the closer the popularity coefficient of the website is to 1, the more frequently the website is used by the user. The vulnerability scan task of the website with the larger popularity coefficient should be scanned preferentially with respect to the vulnerability scan task of the website with the smaller popularity coefficient. It should be noted that, in other embodiments, the popularity coefficient of the website can be calculated according to the traffic volume of the website, or the number of URLs owned by the website, and the like, which is not limited to the calculation manner in this embodiment.

Figure 3:
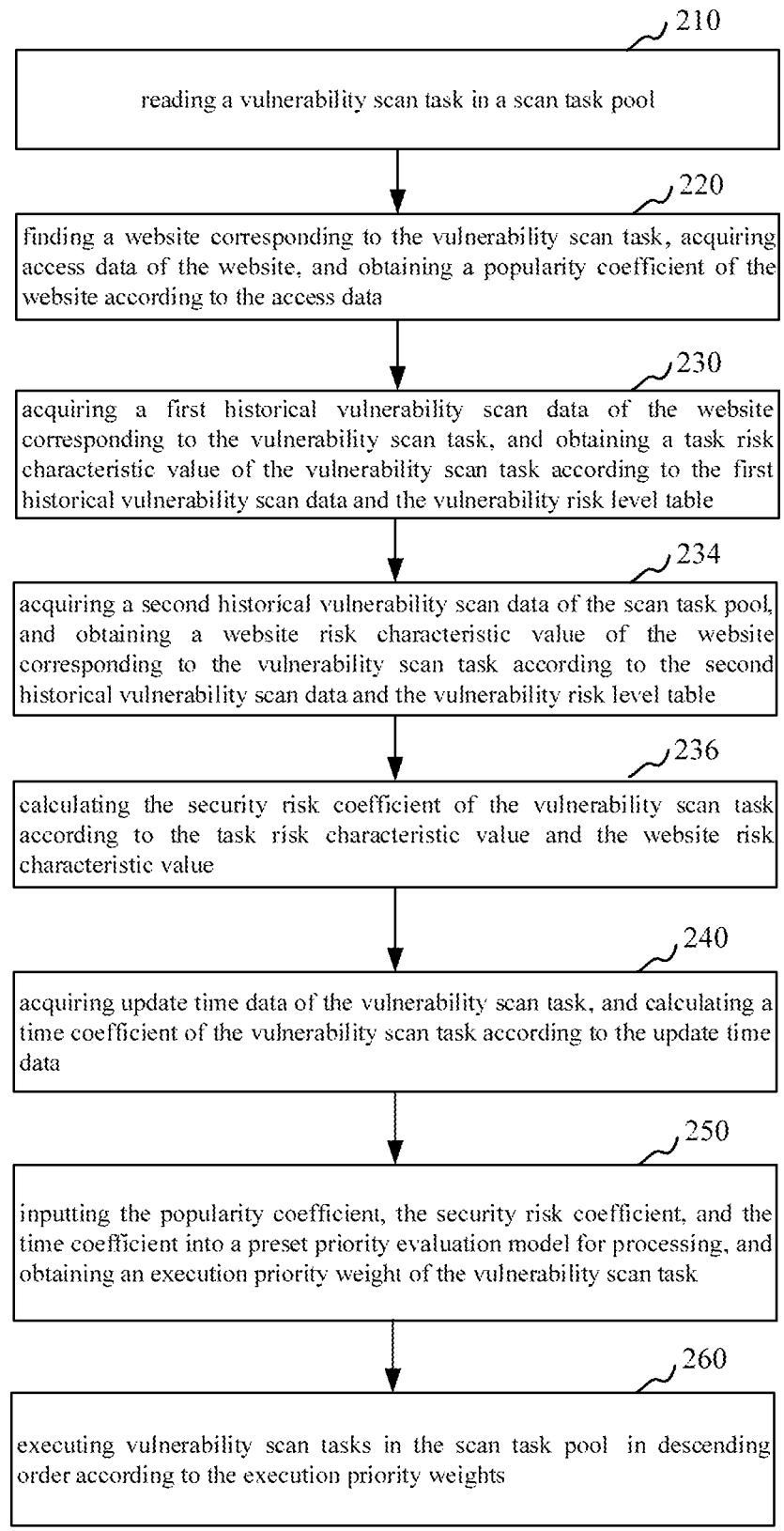
FIG. 3 is a flowchart illustrating a method of scanning website vulnerability according to an another embodiment.

In one embodiment, as shown in FIG. 3, the step 230 specifically includes the following steps.

In step 232, a first historical vulnerability scan data of the website corresponding to the vulnerability scan task is acquired, and a task risk characteristic value of the vulnerability scan task is obtained according to the first historical vulnerability scan data and the vulnerability risk level table.

The first historical vulnerability scan data includes relevant data of security vulnerabilities scanned out in the history scan of the vulnerability scan task, and relevant data of security vulnerabilities scanned out in the history scan of the website corresponding to the vulnerability scan task. The relevant data of the security vulnerabilities includes vulnerability names of the security vulnerabilities, scanned out time and other data. The server acquires the first historical vulnerability scan data according to the task identifier of the vulnerability scan task and the website identifier of the corresponding website thereof, and finds the risk score corresponding to the vulnerability scan task from the vulnerability risk level table according to the vulnerability name of the security vulnerability in the data. The risk score of the security vulnerability scanned out in the history scan of the vulnerability scan task is compared with the risk score of the security vulnerability scanned out in the history scan of the corresponding website. The task risk characteristic value od the vulnerability scan task is obtained according to the comparison result. The higher the task risk characteristic value, the greater the risk of the security vulnerability scanned by the vulnerability scan task. Under the same conditions, the task with the higher task risk characteristic value should be executed preferentially.

In step 234, a second historical vulnerability scan data of the scan task pool, is acquired and a website risk characteristic value of the website corresponding to the vulnerability scan task is obtained according to the second historical vulnerability scan data and the vulnerability risk level table.

The second historical vulnerability scan data includes relevant data of the security vulnerabilities scanned out in the history scan of the website corresponding to the vulnerability scan task, and relevant data of the security vulnerabilities scanned out in the history scan of all websites involved by the scan task pool. The relevant data of the security vulnerabilities includes vulnerability names of the security vulnerabilities, scanned out time and other data. The server finds the website identifier of the corresponding website according to the task identifier of each vulnerability scan task in the scan task pool; acquires the second historical vulnerability scan data according to the website identifier; and finds the corresponding risk score from the vulnerability risk level table according to the vulnerability name of the security vulnerability in the data. The risk score of the security vulnerability scanned out in the history scan of the website corresponding to the vulnerability scan task is compared with the risk score of the security vulnerability scanned out in the history scan of all websites. The website risk characteristic value of the website corresponding to the vulnerability scan task is obtained according to the comparison result. The higher the website risk characteristic value, the greater the risk of the security vulnerability scanned out of the website. Under the same conditions, the vulnerability scan task corresponding to the website with the higher website risk characteristic value should be executed preferentially.

In step 236, the security risk coefficient of the vulnerability scan task is calculated according to the task risk characteristic value and the website risk characteristic value.

The server acquires preset risk weights of the task risk characteristic value and the website risk characteristic value, and calculates the security risk coefficient of the vulnerability scan task according to the task risk characteristic value and the corresponding risk weight thereof, the website risk characteristic value and the corresponding risk weight thereof.

In one embodiment, the step 132 specifically includes the following steps. A vulnerability attribute of a historical scan security vulnerability of the website corresponding to the vulnerability scan task is acquired. A risk score corresponding to the vulnerability attribute is found from the vulnerability risk level table. The risk scores of the historical scan security vulnerabilities of the vulnerability scan task are summed up to obtain a risk value of the vulnerability scan task. The risk scores of the historical scan security vulnerabilities of the corresponding website are summed up to obtain a risk value of the corresponding website. The task risk characteristic value of the vulnerability scan task is calculated according to the risk value of the corresponding website and the risk value of the vulnerability scan task.

The server acquires relevant data of the security vulnerabilities scanned out in the history scan of the website corresponding to the vulnerability scan task. The data also contains data of the security vulnerabilities scanned out in the history scan of the read vulnerability scan task. The vulnerability name of the security vulnerability scanned out in the history scan is acquired. The vulnerability risk level table stores correspondences between the vulnerability names and the vulnerability attributes and correspondences between the vulnerability data and the risk scores. The server finds the vulnerability attribute of the security vulnerability from the vulnerability risk level table according to the vulnerability name. For example, the vulnerability attribute can classify a vulnerability into a general vulnerability, a stubborn vulnerability, a dangerous vulnerability, or the like. The corresponding risk score can be found according to the judged vulnerability attribute. For example, the risk score of the general vulnerability is 1 point, the risk score of the vulnerability is 2 points, and the risk score of the vulnerability is 3 points. The classification and setting rules of the specific vulnerability attribute and the risk score are not limited to the embodiment, and can be set according to specific situations.

The server sums the risk scores of the historical scan security vulnerabilities of the vulnerability scan task to obtain the risk value of the vulnerability scan task. Specifically, it is assumed that the website corresponding to the read vulnerability scan task has n vulnerability scan tasks, and the read vulnerability scan task is the $i^{th}$ vulnerability scan task therein. The $i^{th}$ vulnerability scan task has cumulatively scanned out m security vulnerabilities in the history, the risk score of the $j^{th}$ security vulnerability scanned out is $D_j$, then the risk value $G_i$ of the vulnerability scan task can be calculated by formula (2).

$$G_i = \Sigma_l^m D_j \quad (2)$$

wherein, $D_j \in \{1,2,3\}$, $m \in [0, \infty]$, and $G_i \in [0, \infty]$.

The server sums the risk scores of the historical scan security vulnerabilities of the corresponding website to obtain the risk value of the corresponding website, and calculates the task risk characteristic value of the vulnerability scan task according to the risk characteristic value of the corresponding website and the risk characteristic value of the vulnerability scan task. Specifically, the task risk characteristic value of the $i^{th}$ vulnerability scan task is represented by $Z_i$, the aforementioned calculated risk value $G_i$ of the vulnerability scan task is substituted into formula (3) to calculate the task risk characteristic value.

$$Z_i = \frac{G_i}{\sum_1^n G_i} \quad (3)$$

wherein, $Z_i \in (0,1]$ when $m=0$, $Z_i=0$, and the larger $Z_i$, the higher the security risk of the vulnerability scan task. Under the same conditions, the task should be scanned preferentially.

In one embodiment, the step 234 specifically includes following steps. The vulnerability attribute of the historical scan security vulnerability of each website revolved by the scan task pool is acquired. The risk score corresponding to the vulnerability attribute is found from the vulnerability risk level table. The risk scores of the historical scan security vulnerabilities of the website corresponding to the vulnerability scan task are summed up to obtain the risk value of the website. The risk scores of the historical scan security vulnerability of all websites in the scan task pool are summed up to obtain the risk value of the scan task pool. The website risk characteristic value of the corresponding website is calculated according to the risk value of the corresponding website and the risk characteristic value of the scan task pool.

Specifically, it is assumed that the vulnerability scan task in the scan task pool involves n websites. The $i^{th}$ website has cumulatively scanned out m security vulnerabilities in the history, and the risk score of the $j^{th}$ security vulnerability scanned out is $D_j$, then the risk value $F_i$ of the vulnerability scan task is calculated by formula (4).

$$F_i = \Sigma_1^m D_j \quad (4)$$

wherein, $D_j \in \{1,2,3\}$, $m \in [0, \infty]$, $F_i \in [0, \infty]$.

The website risk characteristic value of the $i^{th}$ website is represented by $H_i$, the aforementioned calculated risk value $F_i$ of the website is substituted into formula (5) to calculate the website risk characteristic value.

$$H_i = \frac{F_i}{\sum_1^m F_i} \quad (5)$$

wherein, $H_i \in (0,1]$, when $m=0$, $H_i=0$, and the larger $H_i$, the higher the security risk of the website. Under the same conditions, the vulnerability scan task corresponding to the website should be scanned preferentially.

In this embodiment, the server calculates the task risk characteristic value and the corresponding website risk characteristic value respectively according to the acquired historical vulnerability scan data of the vulnerability scan task and the historical vulnerability scan data of the website corresponding to the task, and evaluates the security risk coefficient of the vulnerability scan task comprehensively according to the task risk characteristic value and the website characteristic value, which makes the evaluation more comprehensive and accurate.

Figure 4:
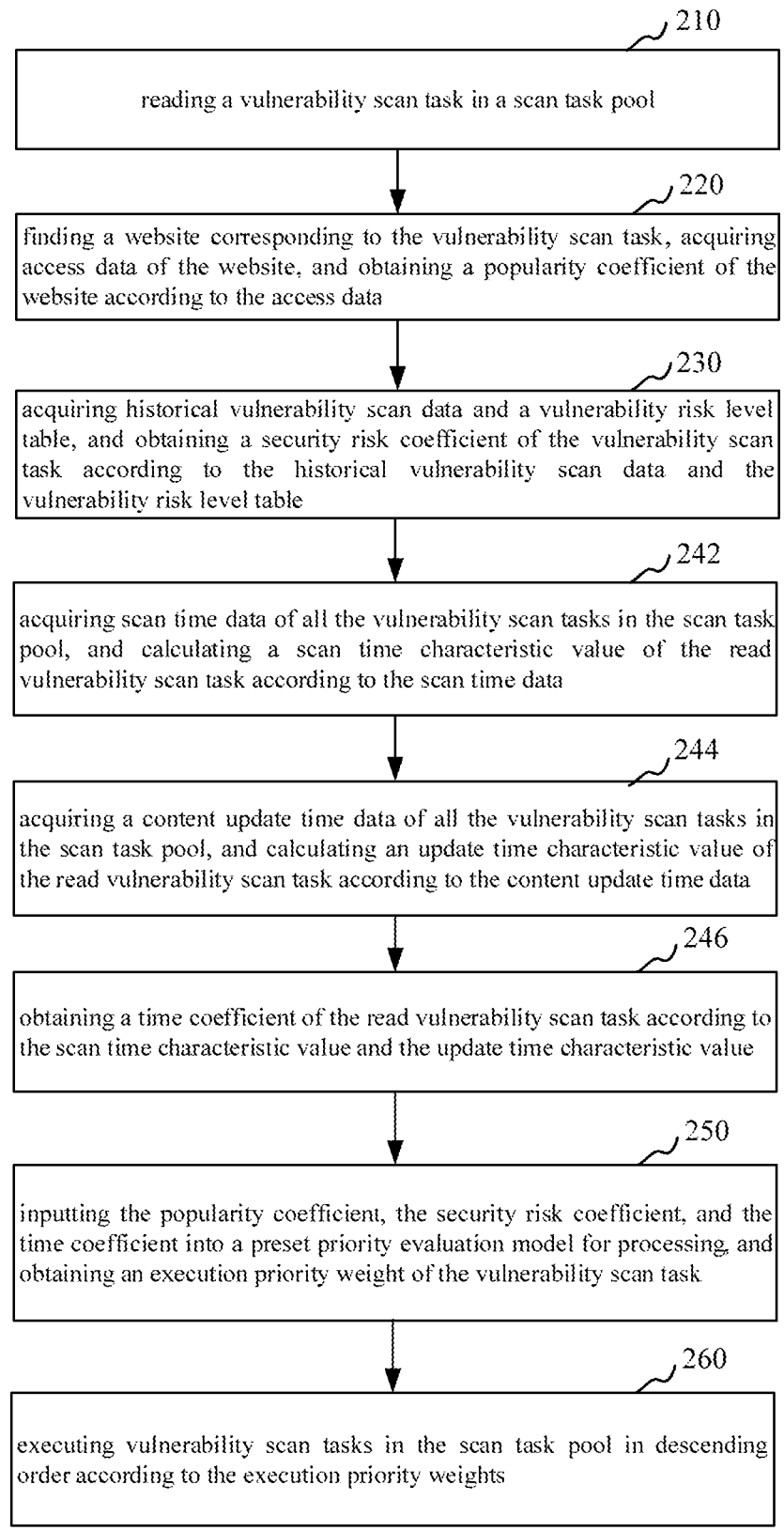
FIG. 4 is a flowchart illustrating a method of scanning website vulnerability according to a still another embodiment.

In one embodiment, as shown in FIG. 4, in step 240 specifically includes following steps.

In step 242, scan time data of all the vulnerability scan tasks in the scan task pool is acquired, and a scan time characteristic value of the read vulnerability scan task is calculated according to the scan time data.

The server acquires the scan time data of all vulnerability scan tasks, which includes the latest execution time of each vulnerability scan task. The server compares the latest execution time of the read vulnerability scan task with the overall data of the latest execution time of each vulnerability scan task in the scan task pool, and calculates the scan time characteristic value of the vulnerability scan task.

In step 244, a content update time data of all the vulnerability scan tasks in the scan task pool is acquired, and an update time characteristic value of the read vulnerability scan task is calculated according to the content update time data.

The server acquires the content update time data of all vulnerability scan tasks, which includes each update time in the history when the task content of each vulnerability scan task is updated. The server compares the update time data of each time when the task content of the read vulnerability scan task is updated with the overall data when the content of each vulnerability scan task in the scan task pool, and calculates the update time characteristic value of the vulnerability scan task.

In step 246, the time coefficient of the read vulnerability scan task is obtained according to the scan time characteristic value and the update time characteristic value.

The server acquires preset time weights of the scan time characteristic value and the update time characteristic value, and calculates the time coefficient of the vulnerability scan task according to the scan time characteristic value and the corresponding time weight thereof, the update time characteristic value and the corresponding time weight thereof.

In one embodiment, the step 242 specifically includes following steps.

The latest time when the read vulnerability scan task scans out the security vulnerability is acquired. The vulnerability scan task with the shortest interval to scanning out security vulnerability and the vulnerability scan task with the longest interval to scanning out security vulnerability are found in the scan task pool, and a time interval between scanning out the two vulnerability scan tasks is calculated. The scan time characteristic value is calculated according to the latest time when the security vulnerability is scanned out and the time interval between the two vulnerability scan tasks.

Specifically, it is assumed that the read vulnerability scan task is the $i^{th}$ task in the scan task pool, and the latest execution time of the $i^{th}$ task is represented by $T_i$. If the task has never been scanned, then $T_i=0$. After acquiring the latest execution time of all tasks in the scan task pool, the server selects the shortest time $T_{MIN}$ to the current time and the longest time $T_{MAX}$ from the current time, and calculates the time interval of two times. The server substitutes the aforementioned data into formula (6) to calculate the scan time characteristic value $E_i$ of the vulnerability scan task, which indicates the weight of the time interval during which the vulnerability scan task is not executed in all tasks of the scan task pool.

$$E_i = \begin{cases} \dfrac{T_{MAX} - T_i}{T_{MAX} - T_{MIN}}, & T_i > 0 \\ 1, & T_i = 0 \end{cases} \qquad (6)$$

Wherein, $T_i \in [0, \infty)$, $E_i \in [0,1]$, the closer the value of $E_i$ is to 1, the longer the vulnerability scan task is not scanned, correspondingly, the higher the execution priority of the vulnerability scan task under the same conditions.

In one embodiment, the step 244 specifically includes following steps. A first time when the latest task content of the read vulnerability scan task is updated is acquired. A vulnerability scan task with the shortest task content update time interval and a vulnerability scan task with the longest task content update time interval are found in the scan task pool. An update time interval of the two found vulnerability scan tasks is calculated. The update time characteristic value is calculated according to the first time and the update time interval.

Specifically, it is assumed that the read vulnerability scan task is the $i^{th}$ task in the scan task pool, and the latest content update time of the $i^{th}$ task is represented by $U_i$. After acquiring the latest content update time of all the tasks in the scan task pool, the server selects the shortest time $U_{MIN}$ to the current time and the longest time $U_{MAX}$ from the current time, and calculates the time interval between the two times. The server substitutes the aforementioned data into formula (7) to calculate the update time characteristic value $K_i$ of the vulnerability scan task, which indicates the weight of the time interval during which the content of the vulnerability scan task is not updated in all tasks of the scan task pool.

$$K_i = \dfrac{U_i - U_{MIN}}{U_{MAX} - U_{MIN}} \qquad (7)$$

Where, $U_i \in [0, \infty)$, $K_i \in [0,1]$, the closer the value of $K_i$ is to 1, the shortest the content update time of the vulnerability scan task is to the current time, correspondingly the higher the risk of the new or newly upgraded security vulnerability, and under the same conditions the higher the execution priority of the vulnerability scan task.

In this embodiment, the server calculates the scan time characteristic value and the update time characteristic value of the vulnerability scan task respectively according to the acquired scan time data and content update time data of the vulnerability scan task; comprehensively calculates the time coefficient of the vulnerability scan task according to the scan time characteristic value and the update time characteristic value; and comprehensively evaluates the time urgency of the vulnerability to be executed from the timeliness of the scanning task and the timeliness of the task update, which makes the evaluation result more comprehensive and effective.

In one embodiment, the preset priority evaluation model employs a multiple linear regression model. The security risk coefficient includes the task risk characteristic value and the website risk characteristic value. The time coefficient includes the scan time characteristic value and the update time characteristic value. The server inputs the popularity coefficient, the task risk characteristic value, the website risk characteristic value, the scan time characteristic value, and the update time characteristic value into the preset priority evaluation model to be multi-dimensional linear regression processed thereby obtaining the execution priority weight of the vulnerability scan task.

Specifically, in this embodiment, the server calculates the popularity coefficient $Y_i$ of the website corresponding to the vulnerability scan task via the formula (1) in the aforementioned embodiment; calculates the task risk characteristic value $Z_i$ according to the formula (2) and the formula (3); calculates the website risk characteristic value $H_i$ of the website corresponding to the vulnerability scan task according to the formula (4) and the formula (5); calculates the scan time characteristic value $E_i$ of the vulnerability scan task via formula (6); and calculates the update time characteristic value $K_i$ of the vulnerability scan task via formula (7). The server substitutes the aforementioned calculated values into formula (8) to calculate the execution priority weight $W_i$ of the vulnerability scan task.

$$W_i = \alpha Y_i + \beta Z_i + \gamma H_i + \delta E_i + \mu K_i \qquad (8)$$

In the formula (8), $\alpha$, $\beta$, $\gamma$, $\delta$, and $\mu$ are respectively the weight values of the popularity coefficient, the task risk characteristic value, the website risk characteristic value, the scan time characteristic value, and the update time characteristic value weight value in the multiple linear regression model, which must satisfy the condition: $\alpha+\beta+\gamma+\delta+\mu=1$. The aforementioned weight values are the optimal values obtained by pre-training. The closer $W_i$ is to 1, the higher the execution priority of the vulnerability scan task.

In this embodiment, the execution priority weight of each scan task in the scan task pool is comprehensively analyzed and calculated from five dimensions of the popularity coefficient of the website corresponding to the vulnerability scan task, the website security risk characteristic value, the security risk characteristic value of the vulnerability scan task, the scan time characteristic value of the task and the update time characteristic value. Finally, the final scheduling priority of the scanning tasks in the scan task pool is determined according to the size of the execution priority weight. The scanning tasks in the sequential scheduling method and the random scheduling method are prevented from being scanned in a meaningless manner, so that the scanning task with the vulnerability or with the larger vulnerability risk can be scanned preferentially, thereby improving the timeliness of discovering the website security risk, which makes it possible to fix the website security vulnerabilities and reduce risks as soon as possible.

It should be noted that in other embodiments, other calculation formulas and methods can be used to evaluate the popularity coefficient, the security risk coefficient, and the time coefficient of the vulnerability scan task, and other preset priority evaluation models can be used to calculate the execution priority weight of the vulnerability scan task, which are not limited to the method described in the aforementioned embodiments.

Figure 5:
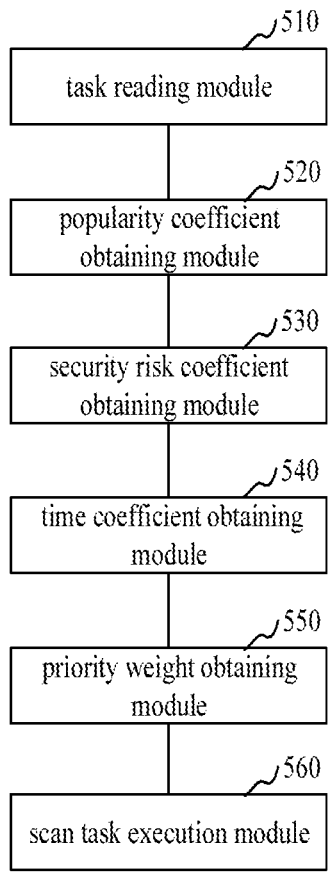
FIG. 5 is a block diagram of a device of scanning website vulnerability according to one of the embodiments.

In one embodiment, as shown in FIG. 5, a device of scanning website vulnerability is provided, which includes following modules.

A task reading module 510 is used for reading a vulnerability scan task in a scan task pool.

A popularity coefficient obtaining module 520 is used for finding a website corresponding to the vulnerability scan task, acquiring access data of the website, and obtaining a popularity coefficient of the website according to the access data.

A security risk coefficient obtaining module 530 is used for acquiring historical vulnerability scan data and a vulnerability risk level table, and obtaining a security risk coefficient of the vulnerability scan task according to the historical vulnerability scan data and the vulnerability risk level table.

A time coefficient obtaining module 540 is used for acquiring update time data of the vulnerability scan task, and calculating a time coefficient of the vulnerability scan task according to the update time data.

A priority weight obtaining module 550 is used for inputting the popularity coefficient, the security risk coefficient, and the time coefficient into a preset priority evaluation model for processing, and obtaining an execution priority weight of the vulnerability scan task.

A scan task execution module 560 is used for executing vulnerability scan tasks in the scan task pool in descending order according to the execution priority weights.

In one embodiment, the security risk coefficient obtaining module 530 includes following modules.

A task risk coefficient obtaining module is used for acquiring a first historical vulnerability scan data of the website corresponding to the vulnerability scan task, and obtaining a task risk characteristic value of the vulnerability scan task according to the first historical vulnerability scan data and the vulnerability risk level table.

A website risk coefficient obtaining module is used for acquiring a second historical vulnerability scan data of the scan task pool, and obtaining a website risk characteristic value of the website corresponding to the vulnerability scan task according to the second historical vulnerability scan data and the vulnerability risk level table.

A risk coefficient calculation module is used for calculating the security risk coefficient of the vulnerability scan task according to the task risk characteristic value and the website risk characteristic value.

In one embodiment, the task risk coefficient obtaining module includes follow modules.

A attribute obtaining module is used for acquiring a vulnerability attribute of the historical scan security vulnerability of the website corresponding to the vulnerability scan task.

A score searching module is used for finding a risk score corresponding to the vulnerability attribute in the vulnerability risk level table.

A task risk value obtaining module is used for summing risk scores of the historical scan security vulnerabilities of the vulnerability scan task to obtain a risk value of the vulnerability scan task.

A website risk value obtaining module is used for summing risk scores of the historical scan security vulnerabilities of the corresponding website to obtain a risk value of the corresponding website.

A risk characteristic value calculation module is used for calculating the task risk characteristic value of the vulnerability scan task according to the risk value of the corresponding website and the risk value of the vulnerability scan task.

In one embodiment, the time coefficient obtaining module 540 includes following modules.

A scan time coefficient obtaining module is used for acquiring scan time data of all the vulnerability scan tasks in the scan task pool, and calculating a scan time characteristic value of the read vulnerability scan task according to the scan time data.

An update time coefficient obtaining module is used for acquiring a content update time data of all the vulnerability scan tasks in the scan task pool, and calculating an update time characteristic value of the read vulnerability scan task according to the content update time data.

A time coefficient calculation module is used for obtaining the time coefficient of the read vulnerability scan task according to the scan time characteristic value and the update time characteristic value.

In one embodiment, the update time coefficient obtaining module includes following modules.

A first time acquiring module is used for acquiring a first time when the latest task content of the read vulnerability scan task is updated.

An update interval calculation module is used for finding a vulnerability scan task with the shortest task content update time interval and a vulnerability scan task with the longest task content update time interval in the scan task pool, and calculating an update time interval of the two found vulnerability scan tasks.

An update characteristic value calculation module is used for calculating the update time characteristic value according to the first time and the update time interval.

Figure 6:
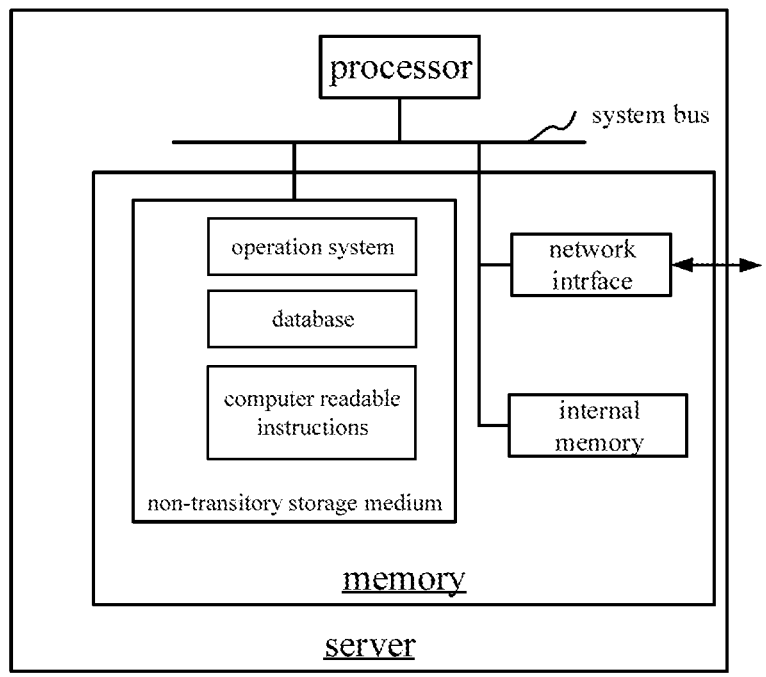
FIG. 6 is a block diagram of a computer apparatus according to one of the embodiments.

The aforementioned device of scanning website vulnerability can be implemented in a form of computer readable instructions which can be executed on a computer apparatus as shown in FIG. 6.

In one embodiment, a server as shown in FIG. 6 is provided, which includes a processor, a memory, and a network interface coupled via a system bus. The processor of the server is used to provide computation and control capabilities. The memory of the server includes a non-transitory storage medium and an internal memory. The non-transitory storage medium of the server stores an operating system and computer readable instructions, which, when executed by the processor cause the processor to implement a website vulnerability scan method. The internal memory of the server provides an operation environment for the operating system and the computer readable instructions in the non-transitory storage medium. The network interface of the server is used to communicate with an outer terminal over a network, for example, receiving a vulnerability scan task and the like sent by the terminal.

Persons skilled in the art can understand that, the structure shown in FIG. 6 is only a part of the structure of the solution of the present disclosure, which does not impose limitation to the server. Specifically, the server can include more or less components than those shown in the drawing, or can combine some components, or can have different component deployment.

In one embodiment, the computer readable instructions when executed by the processor, cause the processor to perform steps including: reading a vulnerability scan task in a scan task pool; finding a website corresponding to the vulnerability scan task, acquiring access data of the website, and obtaining a popularity coefficient of the website according to the access data; acquiring historical vulnerability scan data and a vulnerability risk level table, and obtaining a security risk coefficient of the vulnerability scan task according to the historical vulnerability scan data and the vulnerability risk level table; acquiring update time data of the vulnerability scan task, and calculating a time coefficient of the vulnerability scan task according to the update time data; inputting the popularity coefficient, the security risk coefficient, and the time coefficient into a preset priority evaluation model for processing, and obtaining an execution priority weight of the vulnerability scan task; and executing vulnerability scan tasks in the scan task pool in descending order according to the execution priority weights.

In one embodiment, the computer readable instructions when executed by the processor further cause the processor to perform steps including: acquiring a first historical vulnerability scan data of the website corresponding to the vulnerability scan task, and obtaining a task risk characteristic value of the vulnerability scan task according to the first historical vulnerability scan data and the vulnerability risk level table; acquiring a second historical vulnerability scan data of the scan task pool, and obtaining a website risk characteristic value of the website corresponding to the vulnerability scan task according to the second historical vulnerability scan data and the vulnerability risk level table; and calculating the security risk coefficient of the vulnerability scan task according to the task risk characteristic value and the website risk characteristic value.

In one embodiment, the computer readable instructions when executed by the processor further cause the processor to perform steps including: acquiring a vulnerability attribute of a historical scan security vulnerability of the website corresponding to the vulnerability scan task; finding a risk score corresponding to the vulnerability attribute in the vulnerability risk level table; summing risk scores of the historical scan security vulnerabilities of the vulnerability scan task to obtain a risk value of the vulnerability scan task; summing risk scores of the historical scan security vulnerabilities of the corresponding website to obtain a risk value of the corresponding website; and calculating the task risk characteristic value of the vulnerability scan task according to the risk value of the corresponding website and the risk value of the vulnerability scan task.

In one embodiment, the computer readable instructions when executed by the processor further cause the processor to perform steps including: acquiring scan time data of all the vulnerability scan tasks in the scan task pool, and calculating a scan time characteristic value of the read vulnerability scan task according to the scan time data; acquiring a content update time data of all the vulnerability scan tasks in the scan task pool, and calculating an update time characteristic value of the read vulnerability scan task according to the content update time data; and obtaining the time coefficient of the read vulnerability scan task according to the scan time characteristic value and the update time characteristic value.

In one embodiment, the computer readable instructions when executed by the processor further cause the processor to perform steps including: acquiring a first time when the latest task content of the read vulnerability scan task being updated; finding a vulnerability scan task with the shortest task content update time interval and a vulnerability scan task with the longest task content update time interval in the scan task pool, and calculating an update time interval of the two found vulnerability scan tasks; and calculating the update time characteristic value according to the first time and the update time interval.

In one embodiment, at least one non-transitory computer readable medium is provided storing computer readable instructions, which, when executed by at least one processor cause the at least one processor to perform steps including: reading a vulnerability scan task in a scan task pool; finding a website corresponding to the vulnerability scan task, acquiring access data of the website, and obtaining a popularity coefficient of the website according to the access data; acquiring historical vulnerability scan data and a vulnerability risk level table, and obtaining a security risk coefficient of the vulnerability scan task according to the historical vulnerability scan data and the vulnerability risk level table; acquiring update time data of the vulnerability scan task, and calculating a time coefficient of the vulnerability scan task according to the update time data; inputting the popularity coefficient, the security risk coefficient, and the time coefficient into a preset priority evaluation model for processing, and obtaining an execution priority weight of the vulnerability scan task; and executing vulnerability scan tasks in the scan task pool in descending order according to the execution priority weights.

In one embodiment, the computer readable instructions when executed by the processor further cause the processor to perform steps including: acquiring a first historical vulnerability scan data of the website corresponding to the vulnerability scan task, and obtaining a task risk characteristic value of the vulnerability scan task according to the first historical vulnerability scan data and the vulnerability risk level table; acquiring a second historical vulnerability scan data of the scan task pool, and obtaining a website risk characteristic value of the website corresponding to the vulnerability scan task according to the second historical vulnerability scan data and the vulnerability risk level table; and calculating the security risk coefficient of the vulnerability scan task according to the task risk characteristic value and the website risk characteristic value.

In one embodiment, the computer readable instructions when executed by the processor further cause the processor to perform steps including: acquiring a vulnerability attribute of a historical scan security vulnerability of the website corresponding to the vulnerability scan task; finding a risk score corresponding to the vulnerability attribute in the vulnerability risk level table; summing risk scores of the historical scan security vulnerabilities of the vulnerability scan task to obtain a risk value of the vulnerability scan task; summing risk scores of the historical scan security vulnerabilities of the corresponding website to obtain a risk value of the corresponding website; and calculating the task risk characteristic value of the vulnerability scan task according to the risk value of the corresponding website and the risk value of the vulnerability scan task.

In one embodiment, the computer readable instructions when executed by the processor further cause the processor to perform steps including: acquiring scan time data of all the vulnerability scan tasks in the scan task pool, and calculating a scan time characteristic value of the read vulnerability scan task according to the scan time data; acquiring a content update time data of all the vulnerability scan tasks in the scan task pool, and calculating an update time characteristic value of the read vulnerability scan task according to the content update time data; and obtaining the time coefficient of the read vulnerability scan task according to the scan time characteristic value and the update time characteristic value.

In one embodiment, the computer readable instructions when executed by the processor further cause the processor to perform steps including: acquiring a first time when the latest task content of the read vulnerability scan task being updated; finding a vulnerability scan task with the shortest task content update time interval and a vulnerability scan task with the longest task content update time interval in the scan task pool, and calculating an update time interval of the two found vulnerability scan tasks; and calculating the update time characteristic value according to the first time and the update time interval.

A person skilled in the art should understand that the processes of the methods in the above embodiments can be, in full or in part, implemented by computer readable instructions instructing underlying hardware. The computer readable instructions can be stored in a computer readable storage medium and can include the processes in the embodiments of the various methods when it is being executed. The storage medium herein can be a magnetic disk, an optical disk, a read-only memory (ROM), or the like.

Those skilled in the art can apparently appreciate upon reading the disclosure of this application that the respective technical features involved in the respective embodiments can be combined arbitrarily between the respective embodiments as long as they have no collision with each other. Of course, the respective technical features mentioned in the same embodiment can also be combined arbitrarily as long as they have no collision with each other.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method of scanning web site vulnerability, comprising:
providing a scan task pool with a plurality of vulnerability scan tasks;
for each individual vulnerability scan task in the scan task pool:
reading the vulnerability scan task in the scan task pool;
finding a website corresponding to the vulnerability scan task, acquiring access data of the web site, and obtaining a popularity coefficient of the web site according to the access data;
acquiring historical vulnerability scan data and a vulnerability risk level table, and obtaining a security risk coefficient of the vulnerability scan task according to the historical vulnerability scan data and the vulnerability risk level table;
acquiring update time data of the vulnerability scan task, and calculating a time coefficient of the vulnerability scan task according to the update time data;
inputting the popularity coefficient, the security risk coefficient, and the time coefficient into a preset priority evaluation model for processing, and obtaining an execution priority weight of the vulnerability scan task; and
executing the vulnerability scan tasks in the scan task pool in descending order according to the execution priority weights;
wherein the acquiring historical vulnerability scan data and the vulnerability risk level table, and obtaining the security risk coefficient of the vulnerability scan task according to the historical vulnerability scan data and the vulnerability risk level table comprises:
acquiring a first historical vulnerability scan data of the web site corresponding to the vulnerability scan task, and obtaining a task risk characteristic value of the vulnerability scan task according to the first historical vulnerability scan data and the vulnerability risk level table;
acquiring a second historical vulnerability scan data of the scan task pool, and obtaining a website risk characteristic value of the website corresponding to the vulnerability scan task according to the second historical vulnerability scan data and the vulnerability risk level table; and
calculating the security risk coefficient of the vulnerability scan task according to the task risk characteristic value and the website risk characteristic value;
wherein the acquiring a first historical vulnerability scan data of the web site corresponding to the vulnerability scan task, and obtaining a task risk characteristic value of the vulnerability scan task according to the first historical vulnerability scan data and the vulnerability risk level table comprises:
acquiring a vulnerability attribute of a historical scan security vulnerability of the web site corresponding to the vulnerability scan task;
finding a risk score corresponding to the vulnerability attribute in the vulnerability risk level table;
summing risk scores of the historical scan security vulnerabilities of the vulnerability scan task to obtain a risk value of the vulnerability scan task;
summing risk scores of the historical scan security vulnerabilities of the corresponding website to obtain a risk value of the corresponding website; and
calculating the task risk characteristic value of the vulnerability scan task according to the risk value of the corresponding web site and the risk value of the vulnerability scan task.

2. The method of scanning website vulnerability of claim 1, wherein the acquiring update time data of the vulnerability scan task, and calculating the time coefficient of the vulnerability scan task according to the update time data comprises:
acquiring scan time data of all the vulnerability scan tasks in the scan task pool, and calculating a scan time characteristic value of the read vulnerability scan task according to the scan time data;
acquiring a content update time data of all the vulnerability scan tasks in the scan task pool, and calculating an update time characteristic value of the read vulnerability scan task according to the content update time data; and
obtaining the time coefficient of the read vulnerability scan task according to the scan time characteristic value and the update time characteristic value.

3. The method of scanning website vulnerability of claim 2, wherein the acquiring the content update time data of all the vulnerability scan tasks in the scan task pool, and calculating the update time characteristic value of the read vulnerability scan task according to the content update time data comprises:
acquiring a first time when the latest task content of the read vulnerability scan task being updated;
finding a vulnerability scan task with the shortest task content update time interval and a vulnerability scan task with the longest task content update time interval in the scan task pool, and calculating an update time interval of the two found vulnerability scan tasks; and
calculating the update time characteristic value according to the first time and the update time interval.

4. A server comprising:
one or more processors, and
a memory storing computer readable instructions, which, when executed by the one or more processors cause the one or more processors to perform steps comprising:
providing a scan task pool with a plurality of vulnerability scan tasks;
for each individual vulnerability scan task in the scan task pool:
reading the vulnerability scan task in the scan task pool;
finding a website corresponding to the vulnerability scan task, acquiring access data of the website, and obtaining a popularity coefficient of the website according to the access data;
acquiring historical vulnerability scan data and a vulnerability risk level table, and obtaining a security risk coefficient of the vulnerability scan task according to the historical vulnerability scan data and the vulnerability risk level table;
acquiring update time data of the vulnerability scan task, and calculating a time coefficient of the vulnerability scan task according to the update time data;
inputting the popularity coefficient, the security risk coefficient, and the time coefficient into a preset priority evaluation model for processing, and obtaining an execution priority weight of the vulnerability scan task; and
executing vulnerability scan tasks in the scan task pool in descending order according to the execution priority weights;
acquiring a first historical vulnerability scan data of the website corresponding to the vulnerability scan task, and obtaining a task risk characteristic value of the vulnerability scan task according to the first historical vulnerability scan data and the vulnerability risk level table;
acquiring a second historical vulnerability scan data of the scan task pool, and obtaining a website risk characteristic value of the website corresponding to the vulnerability scan task according to the second historical vulnerability scan data and the vulnerability risk level table; and
calculating the security risk coefficient of the vulnerability scan task according to the task risk characteristic value and the website risk characteristic value;
acquiring a vulnerability attribute of a historical scan security vulnerability of the website corresponding to the vulnerability scan task;
finding a risk score corresponding to the vulnerability attribute in the vulnerability risk level table;
summing risk scores of the historical scan security vulnerabilities of the vulnerability scan task to obtain a risk value of the vulnerability scan task; and
summing risk scores of the historical scan security vulnerabilities of the corresponding website to obtain a risk value of the corresponding website; and
calculating the task risk characteristic value of the vulnerability scan task according to the risk value of the corresponding website and the risk value of the vulnerability scan task;
wherein a bill information comprises an enterprise identifier, a bill identifier, a bill amount, and a bill time, an account information comprises a enterprise identifier and an account amount.

5. The server of claim 4, wherein the memory further comprises instructions, which, when executed by the processor, cause the processor to perform steps comprising:
acquiring scan time data of all the vulnerability scan tasks in the scan task pool, and calculating a scan time characteristic value of the read vulnerability scan task according to the scan time data;
acquiring a content update time data of all the vulnerability scan tasks in the scan task pool, and calculating an update time characteristic value of the read vulnerability scan task according to the content update time data; and
obtaining the time coefficient of the read vulnerability scan task according to the scan time characteristic value and the update time characteristic value.

6. The server of claim 5, wherein the memory further comprises instructions, which, when executed by the processor, cause the processor to perform steps comprising:
acquiring a first time when the latest task content of the read vulnerability scan task being updated;
finding a vulnerability scan task with the shortest task content update time interval and a vulnerability scan task with the longest task content update time interval in the scan task pool, and calculating an update time interval of the two found vulnerability scan tasks; and
calculating the update time characteristic value according to the first time and the update time interval.

7. At least one non-transitory computer readable storage medium comprising computer readable instructions, which, when executed by one or more processors, cause the one or more processors to perform steps comprising:
providing a scan task pool with a plurality of vulnerability scan tasks;
for each individual vulnerability scan task in the scan task pool:
reading the vulnerability scan task in the scan task pool;
finding a website corresponding to the vulnerability scan task, acquiring access data of the web site, and obtaining a popularity coefficient of the web site according to the access data;
acquiring historical vulnerability scan data and a vulnerability risk level table, and obtaining a security risk coefficient of the vulnerability scan task according to the historical vulnerability scan data and the vulnerability risk level table;
acquiring update time data of the vulnerability scan task, and calculating a time coefficient of the vulnerability scan task according to the update time data;
inputting the popularity coefficient, the security risk coefficient, and the time coefficient into a preset priority evaluation model for processing, and obtaining an execution priority weight of the vulnerability scan task; and
executing vulnerability scan tasks in the scan task pool in descending order according to the execution priority weights;
acquiring a first historical vulnerability scan data of the website corresponding to the vulnerability scan task, and obtaining a task risk characteristic value of the vulnerability scan task according to the first historical vulnerability scan data and the vulnerability risk level table;
acquiring a second historical vulnerability scan data of the scan task pool, and obtaining a website risk characteristic value of the website corresponding to the vulnerability scan task according to the second historical vulnerability scan data and the vulnerability risk level table;
calculating the security risk coefficient of the vulnerability scan task according to the task risk characteristic value and the website risk characteristic value;
acquiring a vulnerability attribute of a historical scan security vulnerability of the website corresponding to the vulnerability scan task;
finding a risk score corresponding to the vulnerability attribute in the vulnerability risk level table;

summing risk scores of the historical scan security vulnerabilities of the vulnerability scan task to obtain a risk value of the vulnerability scan task; and summing risk scores of the historical scan security vulnerabilities of the corresponding website to obtain a risk value of the corresponding website; and calculating the task risk characteristic value of the vulnerability scan task according to the risk value of the corresponding website and the risk value of the vulnerability scan task.

8. The storage medium of claim 7, wherein the computer readable instructions, which, when executed by one or more processors, cause the one or more processors to perform steps comprising:

acquiring scan time data of all the vulnerability scan tasks in the scan task pool, and calculating a scan time characteristic value of the read vulnerability scan task according to the scan time data;

acquiring a content update time data of all the vulnerability scan tasks in the scan task pool, and calculating an update time characteristic value of the read vulnerability scan task according to the content update time data; and obtaining the time coefficient of the read vulnerability scan task according to the scan time characteristic value and the update time characteristic value.

9. The storage medium of claim 8, wherein the computer readable instructions, which, when executed by one or more processors, cause the one or more processors to perform steps comprising:

acquiring a first time when the latest task content of the read vulnerability scan task being updated;

finding a vulnerability scan task with the shortest task content update time interval and a vulnerability scan task with the longest task content update time interval in the scan task pool, and calculating an update time interval of the two found vulnerability scan tasks; and calculating the update time characteristic value according to the first time and the update time interval.

* * * * *